US012790504B2

(12) United States Patent
Eierhoff et al.

(10) Patent No.: US 12,790,504 B2
(45) Date of Patent: Nov. 10, 2026

(54) METHOD OF PREPARING AN AQUEOUS TITANIUM DIOXIDE SLURRY, THE THUS PRODUCED SLURRY AND COATING COMPOSITIONS CONTAINING THE SAME

(71) Applicant: BASF COATINGS GMBH, Münster (DE)

(72) Inventors: Dirk Eierhoff, Münster (DE); Christina Forell, Münster (DE)

(73) Assignee: BASF COATINGS GMBH, Muenster (DE)

(*) Notice: Subject to any disclaimer, the term of this patent is extended or adjusted under 35 U.S.C. 154(b) by 703 days.

(21) Appl. No.: 18/247,949

(22) PCT Filed: Oct. 6, 2021

(86) PCT No.: PCT/EP2021/077612

§ 371 (c)(1),
(2) Date: Apr. 5, 2023

(87) PCT Pub. No.: WO2022/074073

PCT Pub. Date: Apr. 14, 2022

(65) Prior Publication Data

US 2023/0374320 A1 Nov. 23, 2023

(30) Foreign Application Priority Data

Oct. 7, 2020 (EP) .................................... 20200512

(51) Int. Cl.

| | |
|---|---|
| ***C09D 7/61*** | (2018.01) |
| ***B05D 7/00*** | (2006.01) |
| ***C09C 1/00*** | (2006.01) |
| ***C09C 3/04*** | (2006.01) |
| ***C09D 5/03*** | (2006.01) |
| ***C09D 7/20*** | (2018.01) |
| ***C09D 7/65*** | (2018.01) |

(52) U.S. Cl.

CPC ............... *C09D 7/61* (2018.01); *B05D 7/572* (2013.01); *C09C 1/0084* (2013.01); *C09C 3/04* (2013.01); *C09D 5/035* (2013.01); *C09D 7/20* (2018.01); *C09D 7/65* (2018.01); *B05D 2202/00* (2013.01); *B05D 2601/24* (2013.01)

(58) Field of Classification Search

CPC ....... C09C 1/0084; C09C 3/04; C09C 1/3684; C09C 1/3676; B05D 2202/00; B05D 2601/24; C01P 2006/22; C09K 23/00; C09K 23/002

USPC ........................................................ 524/497

See application file for complete search history.

(56) References Cited

U.S. PATENT DOCUMENTS

| | | | | |
|---|---|---|---|---|
| 5,824,145 | A | 10/1998 | Marganski et al. | |
| 2003/0209695 | A1* | 11/2003 | Tsuzuki ................ | C09K 23/42 252/363.5 |
| 2004/0094425 | A1* | 5/2004 | Grosse-Brinkhaus ....................... | B05D 7/544 205/198 |
| 2005/0159523 | A1* | 7/2005 | Bremser ................ | B82Y 30/00 524/386 |
| 2005/0282928 | A1 | 12/2005 | Lin et al. | |
| 2009/0176925 | A1* | 7/2009 | Matsunaga ........... | C09D 17/00 524/500 |
| 2014/0275442 | A1 | 9/2014 | Goparaju et al. | |

FOREIGN PATENT DOCUMENTS

| | | | | |
|---|---|---|---|---|
| CN | 107141891 A * | 9/2017 | ........... | C09D 17/004 |
| EP | 3467050 A1 | 4/2019 | | |

OTHER PUBLICATIONS

Machine English translation of Fan, Guang, CN-107141891-A, Sep. 8, 2017. (Year: 2017).*
English Translation of WO 2020091003. (Year: 2020).*
International Search Report and Written Opinion for corresponding PCT/EP2021/077612 mailed Jan. 14, 2022, 15 pages.

* cited by examiner

*Primary Examiner* — Hannah J Pak
(74) *Attorney, Agent, or Firm* — Armstrong Teasdale LLP

(57) ABSTRACT

Disclosed herein is a method for producing an aqueous titanium dioxide slurry. The method includes (a) providing an aqueous dispersion medium, and (b) dispersing titanium dioxide into the aqueous dispersion medium provided in step (a) to obtain a titanium dioxide slurry containing at least 65 wt.-% up to 85 wt.-% of titanium dioxide, based on the total weight of the thus obtained slurry, where step (b) is carried out by sole use of a non-milling mixing device and at least until the Hegman fineness of the titanium dioxide particles is below 8 μm. Further disclosed herein are a slurry obtained from the disclosed method, a coating composition containing the same, and a method for producing a coating and a thus coated substrate.

5 Claims, No Drawings

METHOD OF PREPARING AN AQUEOUS TITANIUM DIOXIDE SLURRY, THE THUS PRODUCED SLURRY AND COATING COMPOSITIONS CONTAINING THE SAME

CROSS-REFERENCE TO RELATED APPLICATIONS

This application is a U.S. National Phase Application of International Patent Application No. PCT/EP2021/077612, filed Oct. 6, 2021, which claims priority to European Patent Application No. 20200512.0, filed Oct. 7, 2020, each of which is hereby incorporated by reference herein.

The present invention relates to a method of preparing an aqueous titanium dioxide slurry, a thus prepared slurry and its use in aqueous coating compositions, particularly in automotive coating compositions, such as aqueous filler compositions and aqueous basecoat compositions. The invention further relates to a method for producing a coating and the thus coated substrate.

TECHNOLOGICAL BACKGROUND

Currently, the color of white is the most popular color globally with over a third of all cars produced falling in a white color space. The most frequently used white pigment, is titanium dioxide which combines good availability, good processability and a wide range of properties required in the coatings industry, particularly in the automotive coatings industry. Furthermore, white pigments are widely used for producing lighter color shades of colored compositions.

In the preparation of coating compositions, typically titanium dioxide pigments are employed as pigment pastes containing, beside the pigment, varying amounts of binders and solvents.

Such titanium dioxide slurries are typically provided in form of mill bases produced in a two-step process, wherein in a first step a pre-dispersion is produced by use of a dissolver and in a second step the final paste/dispersion is produced by milling the pre-dispersion. However, due to the two-step process, such existing aqueous titanium dioxide slurries are restricted by the conditions to be observed for the second step, such as milling viscosities which are typically lower than the viscosities in the first step. Lower viscosities are, however, associated with a higher amount of liquid carrier medium, thus a lower pigment content.

Pigment pastes obtained in such two-step process may show an excellent storage stability, a desirable particle size distribution as well as good coloristic properties, however, they contain a relatively high amount of binders in relation to the pigment and simultaneously a titanium dioxide amount of typically not more than about 50% by weight.

WO 2006/010438 A1 describes aqueous titanium dioxide pigment preparations containing even less than 45 wt.-% of titanium dioxide, which have to be milled with a high-energy mill after pre-dispersing the titanium dioxide with an Ystral Conti-TDS 3 jetstream dissolver.

WO 2013/159090 A1 describes a method for making pigment grind dispersions of titanium dioxide pigment containing a significant amount of polymers.

Beside the fact that a two-step process as described above is energy, time and cost consuming, the high amount of binders used in such dispersions, necessary to keep the dispersions stable against settlement of the pigments during storage, necessarily limits the use of such slurries to coating compositions having a compatible binder concept.

Thus, it is highly desirable to provide titanium dioxide slurries containing a high amount of titanium dioxide pigment and a low amount of binders, to avoid incompatibilities with the binders needed in the target coating composition, wherein the slurry is to be applied.

In some cases, pigment slurries are pre-dispersed with very low amounts of binders, however, in such state-of-the-art slurries, the pre-dispersions are milled subsequently to obtain the desired particle size distribution.

There are also some commercially available binder-free slurries, which were tested in the experimental part of the present invention as comparative titanium dioxide slurries. Such slurries are for example also used in US 2010/0104884 A1.

U.S. Pat. No. 9,903,021 B1 describes the preparation of a white dispersion containing titanium dioxide, having a low binder content and having a solids content of 69.8 wt.-%, based on the weight of the dispersion. However, this dispersion, before use, was ground in a mill, thus requiring a milling step for its production.

However, such binder-free slurries typically have a pigment-content lower than desired and/or a viscosity higher than desired, such that the pumpability in an automated process is hard to be realized and limits the use of rheology control additives.

Problems

Since the state-of-the-art titanium dioxide slurries suffer from different problems as lined out above, there is a continuing desire for new titanium dioxide slurries and methods to produce them in a way where no milling step is required, but only a dispersing step. Further, it is not aimed to obtain a completely binder-free titanium dioxide slurry, but an aqueous slurry which contains only a small amount of selected binders. The titanium dioxide slurries of the present invention should preferably be universally employable slurries, which may be used in a large variety of different target systems such as different coating compositions based on different binder concepts.

It is further desired that the titanium dioxide slurries have a high pigment content, but a low viscosity, particularly the low-shear viscosity should be low to ensure a good pumpability. Nevertheless, the titanium dioxide pigment slurries of the present invention should show a good storage stability, preventing an excessive settling of the pigments in the slurry and in case some settling occurs, it should be easy to redisperse the sediment by simple stirring-up.

Furthermore, it was desired that the slurries can be produced in a simple automated process.

Coatings prepared from aqueous coating compositions containing the aqueous titanium dioxide slurries, particularly coatings prepared from filler compositions, primer compositions and/or basecoat compositions should have excellent gloss and brightness, low haze, a high pinhole limit and excellent levelling.

SUMMARY

The above aims were achieved by providing a method for producing an aqueous titanium dioxide slurry, comprising the steps of (a) providing an aqueous dispersion medium, containing, based on the total weight of the dispersion medium,
  a. at least 50 wt.-% of water;

b. 10 wt.-% to 28 wt.-% of at least one water-soluble and/or water-miscible organic solvent having a boiling point above 100° C.;

c. 1.0 wt.-% to 5.0 wt.-% of at least one defoamer, comprising a silicon oil and/or mineral oil and hydrophobic solid particles; and d. 6.0 wt.-% to 20.0 wt.-% of at least one dispersing agent being selected from the group consisting of polymers containing polyalkyleneoxide groups, the polymers being selected from anionic poly(meth) acrylates and copolymers of (meth)acrylic acid and maleic anhydride, the maleic anhydride being at least partially hydrolyzed and/or neutralized; wherein a., b., c. and d. sum up to 95 wt.-% to 100 wt.-% of the total weight of the dispersion medium (b) dispersing titanium dioxide into the aqueous dispersion medium provided in step (a) to obtain a titanium dioxide slurry containing at least 65 wt.-% up to 85 wt.-% of titanium dioxide, based on the total weight of the thus obtained slurry, wherein step (b) is carried out by sole use of a non-milling mixing device and at least until the Hegman fineness of the titanium dioxide particles is below 15 μm; and optionally (c) adjusting the titanium dioxide content of the titanium dioxide slurry obtained in step (b) to an amount from 65 wt.-% to 75 wt.-% based on the total weight of the titanium dioxide slurry by adding a binder-free aqueous medium and optionally a pH adjusting agent.

This method is also called "method for producing an aqueous titanium dioxide slurry according to the invention".

Further object of the present invention is a titanium dioxide slurry obtainable by the afore-mentioned method, the titanium dioxide slurry containing, based on the total weight of the titanium dioxide slurry, i. 10 wt.-% to 30 wt.-% of water;

ii. 65 wt.-% to 85 wt.-% of titanium dioxide having a Hegman fineness of less than 15 μm;

iii. 1.0 wt.-% to 5.0 wt.-% of at least one water-soluble and/or water-miscible organic solvent having a boiling point above 100° C.;

iv. 0.2 wt.-% to 1.0 wt.-% of at least one defoamer comprising a silicon oil and/or mineral oil and hydrophobic solid particles;

v. 1.0 wt.-% to 5.0 wt.-% of a dispersing agent being selected from the group consisting of polymers containing polyalkyleneoxide groups, the polymers being selected from anionic poly(meth)acrylates and their mixtures with copolymers of (meth)acrylic acid and maleic anhydride, the maleic anhydride being at least partially hydrolyzed and/or neutralized; wherein i., ii., iii., iv. and v. sum up to 95 wt.-% to 100 wt.-% of the total weight of the titanium dioxide slurry.

Such slurries are also called "aqueous titanium dioxide slurries according to the invention" or in the experimental part "premix of pigments according to the invention".

Yet another object of the present invention is an aqueous coating composition, comprising (A) at least one polymer selected from the group consisting self-crosslinkable polymers and externally crosslinkable polymers;

(B) at least one crosslinking agent for crosslinking the at least one polymer (A), if the (A) at least one polymer is an externally crosslinkable polymer; and an aqueous titanium dioxide slurry as obtained according to steps (a) to (c) of the method for producing an aqueous titanium dioxide slurry according to the invention or as defined for the aqueous titanium dioxide slurry according to the invention.

Such aqueous coating compositions are also called "aqueous coating compositions according to the invention".

Further object of the present invention is a method for producing a coating, preferably a multilayer coating.

Such coating also called "coating according to the invention".

A further object of the present invention is a coated substrate obtainable according to the afore-mentioned method.

Such coated substrate is also called "coated substrate according to the invention".

DETAILED DESCRIPTION OF THE INVENTION

In the following the invention will be explained in more detail further disclosing preferred embodiments of the invention.

Method of Producing an Aqueous Titanium Dioxide Slurry

Step (a)

In the first step of the method of producing the aqueous titanium dioxide slurry according to the present invention an aqueous dispersion medium is provided.

Water Content

Main ingredient of the aqueous dispersion medium is water. The aqueous dispersion medium contains at least 50 wt.-%, preferably at least 55 wt.-% and even more preferred at least 60 wt.-% of water, based on the total weight of the aqueous dispersion medium. Preferably the water content is less than 85 wt.-%, more preferred less than 80 wt.-% and most preferred less than 75 wt.-% based on the total weight of the aqueous dispersion medium.

Water-Soluble and/or Water-Miscible Organic Solvent

The aqueous dispersion medium further contains a water-soluble and/or water-miscible organic solvent in an amount from 10 wt.-% to 28 wt.-%, preferred 12 wt.-% to 25 wt.-% and more preferred 15 to 23 wt.-% based on the total weight of the aqueous dispersion medium.

The water-soluble and/or water-miscible organic solvent has a boiling point under IUPAC standard conditions of at least 100° C., more preferred at least 110° C., even more preferred at least 140° C. and most preferred at least 160° C. The water-soluble and/or water-miscible organic solvent serves to e.g. reduce the risk of surface drying at the rim of the vessel or storage tank that might finally lead to seeds in the applied coating or to prevent skin formation. If the boiling point of the water-soluble and/or water-miscible organic solvent is too low a significant amount of the solvent tends to evaporate leaving dried titanium dioxide aggregates or agglomerates at the walls of the mixing device, which may get back into the final slurry. If such slurry is employed in a coating composition the appearance and homogeneity of the coatings may suffer due to such aggregates/agglomerates.

Preferably the water-soluble and/or water-miscible organic solvent is selected from the group of solvents of formula (I):

$$R^1O—[R—O]_n—R^2, \qquad (I)$$

wherein n is 1 to 4, preferably 1 to 3 and more preferred 1 or 2;

residue $R^1$ is H or an alkyl group having 1 to 6 carbon atoms, preferably 1 to 4 carbon atoms more preferably 1 to 3, such as 1, 2 or 3 carbon atoms;

residue $R^2$ is H or an alkyl group having 1 to 6 carbon atoms, preferably 1 to 4 carbon atoms more preferably 1 to 3, such as 1, 2 or 3 carbon atoms; and the n residues R are independently selected from the group consisting of $CH_2CH_2$, $CH_2CH_2CH_2$, $CH(CH_3)CH_2$ and/or $CH_2CH(CH_3)$; and at least one of $R^1$ and $R^2$=H.

The water-soluble and/or water-miscible organic solvents are preferably selected from the group consisting of glycols such as triethylene glycol and glycol ethers, such as butyl glycol, butyl diglycol, 1-methoxy-2-propanol or propylene glycol n-propyl ether.

Defoamer

The aqueous dispersion medium further contains at least one defoamer in an amount of 1.0 wt.-% to 5.0 wt.-%, preferably 1.5 wt.-% to 4.0 wt.-% and more preferred 1.8 to 3.5 wt.-% based on the total weight of the aqueous dispersion medium. The defoamers used herein comprise at least an oil selected from silicon oils and mineral oils, preferably mineral oils, most preferred mineral oils from the group of hydrogenated naphthenic mineral oils.

The defoamer further contains hydrophobic solid particles, preferably from the group consisting of hydrophobic ureas or hydrophobic silicas, most preferred from the group of hydrophobic silicas. Hydrophobic silicas are preferably selected from the group of fumed and precipitated silicas which are surface-treated with organosilanes.

The defoamer may further contain emulsifiers, preferably non-ionogenic emulsifiers and polymeric ingredients in minor amounts.

Most preferred the defoamer comprises at least a mineral oil and hydrophobic silica, the mineral oil preferably being selected from hydrogenated naphthenic mineral oils.

Dispersing Agent

The aqueous dispersion medium further contains 6.0 wt.-% to 20.0 wt.-%, preferably 8 wt.-% to 18 wt.-% and more preferred 10 to 16 wt.-% of at least one dispersing agent being selected from the group consisting of polymers containing polyalkyleneoxide groups, the polymers being selected from anionic poly(meth)acrylates and copolymers of (meth)acrylic acid and maleic anhydride, the maleic anhydride being at least partially hydrolyzed and/or neutralized.

Preferably the anionic poly(meth)acrylates comprise polyalkyleneoxide groups as side chains and carboxylic acid which are at least partially in form of their salts. It is preferred that they further contain carboxylic acid ester groups and nitrogen containing aromatic groups.

The term "(meth)acrylates" as used herein denotes acrylates and methacrylates. Polymers containing (meth)acrylates may contain acrylates or methacrylates or both.

The preferred poly(meth)acrylates preferably comprise polymerized units of (meth)acrylic acid, (meth)acrylic acid esters of alkanols, particularly alkanols containing 1 to 8, preferably 2 to 6 carbon atoms, (meth)acrylic acid esters of polyethyleneoxides, preferably polyethyleneoxides having a number average molecular weight determined by end group determination of 200 g/mol to 1000 g/mol, preferably 300 g/mol to 800 g/mol and more preferred 400 to 600 g/mol, and polymerized units of heteroaromatic vinyl group containing monomers containing nitrogen as heteroatom such as vinyl pyridine.

The anionic poly(meth)acrylates can e.g. be prepared by free-radical polymerization of the monomers, a method which is well-known to the one skilled in the art. Free-radical polymerization is typically carried out in the presence of a polymerization initiator, such as peroxo compounds, azo compounds or redox initiator systems, in the absence or presence of chain transfer agents. Those monomers, which will form the anionic groups are typically employed in their free acid form and at least partially neutralized after polymerization. Typical polymerization temperatures range from 30 to 150° C. at atmospheric pressure. Polymerization might be carried out in bulk of preferably in a solvent or solvent mixture which preferably increases the solubility of at least one of the monomers.

The copolymers of (meth)acrylic acid and maleic anhydride, the maleic anhydride being at least partially hydrolyzed and/or neutralized and the copolymers containing polyalkyleneoxide groups as side chains, even further preferred polyethyleneoxide side chains can also be used as dispersants, alone or in combination with the above poly (meth)acrylates. Such copolymers are e.g. under the tradename Tego 752W from Evonik. However, they are also obtainable by radical polymerization.

Particularly preferred are mixtures of the anionic poly (meth)acrylates with the copolymers of (meth)acrylic acid and maleic anhydride, the maleic anhydride being at least partially hydrolyzed and/or neutralized and the copolymers containing polyalkyleneoxide groups as side chains, even further preferred polyethyleneoxide side chains.

Such dispersing agents are preferred in the present invention and e.g. available from BASF SE under the tradename Dispex®, such as Dispex® Ultra PX 4575.

Step (b)

Titanium Dioxide

The titanium dioxide as used in step (b) is typically a titanium dioxide powder, preferably of the rutile-type as obtainable from numerous commercial sources, such as KRONOS INTERNATIONAL, Inc. (e.g. KRONOS 2310 or KRONOS 2360), Chemours Titanium Technologies (e.g. Ti-Pure™ R-960 or Ti-Pure™ TS-6200), Tronox (e.g. TiONA® 826 or TiONA® 595), Lomon Billions (e.g. BILLIONS® BLR-601 or LOMON® R-996) or Venator (e.g. TIOXIDE® TR92 or TIOXIDE® TR88).

Procedural Features

In step (b) the titanium dioxide is introduced into the aqueous dispersion medium provided in step (a) to obtain a titanium dioxide slurry containing at least 65 wt.-% up to 85 wt.-% of titanium dioxide, based on the total weight of the thus obtained slurry.

Step (b) is carried out by sole use of a non-milling mixing device particularly preferred a dissolver, more particularly preferred a dissolver of the rotor-stator type. Particularly preferred are also mixing devices of the jetstream type or inline-dissolvers. Such non-milling mixing devices are e.g. available from Netzsch under the tradename MasterMix®, Cavitron under the tradename Cavitron® CD1010 and Ystral under the tradename Conti-TDS®.

The term "non-milling" as used herein in connection with the mixing device means that no mill is used to produce the aqueous titanium dioxide slurries according to the present invention. A "mill", in the meaning of the present invention, makes use of non-abrasive grinding media, such as steel, porcelain, ceramics, aluminum oxide, zirconium oxide or hardened glass. In a milling process, dispersing is achieved due to grinding the pigments to be dispersed between the grinding media and/or the grinding media and the walls of the mill.

The complete method for producing the aqueous titanium dioxide slurry according to the invention does not contain any step, wherein grinding media are used to produce the dispersion.

Step (b) is carried out at least until the Hegman fineness of the titanium dioxide particles is below 15 μm, preferably below 12 μm, more preferred below 10 μm, even more preferred below 8 μm, such as below 5 μm. This is typically accomplished in the non-milling mixing device within a few minutes. Generally, the mixing time (i.e. the dispersing time) is between 1 min and 30 min, more typically between 2 min and 25 min, preferably between 3 min and 20 min, more preferred between 4 min and 15 min, such as 5 to 10 min.

In step (b), the temperature of the slurry being produced should preferably not exceed 90° C., more preferred the temperature should not exceed 80° C., even more preferred the temperature should not exceed 70° C. and most preferred the temperature should not exceed 60° C. or be below 50° C. If the temperature is too high re-agglomeration of the pigments may occur and/or graying. In case such problems occur, the temperature should be lowered.

Furthermore, it is preferred that the low-shear viscosity (1 $s^{-1}$) of the slurry, determined as described in the experimental part, should preferably not exceed 1800 mPas, more preferred it should not exceed 1000 mPas and most preferred it should not exceed 500 m Pas.

The determination of the Hegman fineness is accomplished as described in the experimental part of the present invention.

Step (c)

Step (c) is an optional step. Since it is possible to use more or less water in the aqueous dispersion medium as used in step (a), it is particularly possible to adjust the solids content, viscosity and pH value of the aqueous titanium dioxide slurry in optional step (c).

Thus, in step (c) typically a binder-free aqueous medium, such as water or mixtures of water with a water-soluble and/or water-miscible organic solvent maybe added to obtain the desired titanium dioxide content. It is also possible to add pH adjusting agents such as an organic amine like ethanol amine, diethanolamine or triethanolamine in step (c).

Step (c) is not followed by a milling step, as no milling step is part of the method for producing the aqueous titanium dioxide slurries of the present invention.

The aqueous titanium dioxide slurries obtained by the above method are storage stable and even if sedimentation occurs, the slurry is easily re-dispersible by simple stirring. The aqueous titanium dioxide slurries can be used directly, without further milling or treatment. The thus produced slurry is ready to be introduced into aqueous coating compositions containing a variety of different binders.

For the purposes of the present invention, the term "binder" is understood in accordance with DIN EN ISO 4618 (German version, date: March 2007) to be the non-volatile fraction of a coating composition which is responsible for the film formation. Pigments contained therein and/or fillers are thus not subsumed under the term of the "binder".

Aqueous Titanium Dioxide Slurry

Preferably the amount of water in the aqueous titanium dioxide slurry is in the range from 15 wt.-% to 30 wt.-%, more preferred 20 wt.-% to 30 wt.-%, based on the total weight of the aqueous titanium dioxide slurry.

Preferably the amount of titanium dioxide as defined above in the aqueous titanium dioxide slurry is in the range from 65 wt.-% to 80 wt.-%, more preferred 65 wt.-% to 75 wt.-%, based on the total weight of the aqueous titanium dioxide slurry.

Preferably the amount of the at least one water-soluble and/or water-miscible organic solvent having a boiling point above 100° C. in the aqueous titanium dioxide slurry is in the range from 2.0 wt.-% to 5.0 wt.-%, more preferred 2.5 wt.-% to 4.5 wt.-%, based on the total weight of the aqueous titanium dioxide slurry.

Preferably the amount of the at least one defoamer as defined above in the aqueous titanium dioxide slurry is in the range from 0.3 wt.-% to 0.9 wt.-%, more preferred 0.4 wt.-% to 0.8 wt.-%, based on the total weight of the aqueous titanium dioxide slurry.

Preferably the amount of the at least one dispersing agent as defined above in the aqueous titanium dioxide slurry is in the range from 1.5 wt.-% to 4.0 wt.-%, more preferred 1.7 wt.-% to 3.8 wt.-%, based on the total weight of the aqueous titanium dioxide slurry.

In case further additional hydrophobic solid particles are contained as ingredient vi., preferably hydrophobic silica is contained, the amount is preferably below 0.5 wt.-%, more preferred below 0.4 wt.-%, most preferred below 0.3 wt.-%, such as 0.2 wt.-% or below, based on the total weight of the aqueous titanium dioxide slurry. Such hydrophobic silica is preferably selected from fumed or precipitated, preferably fumed silica. Such silicas are e.g. commercially available from Evonik under the tradename Aerosil® R 972.

Preferably the pH value of the aqueous titanium dioxide slurry according to the invention is between 7 and 10, more preferred between 7.5 and 9.5, most preferred between 8.0 and 9.0.

Preferably the aqueous titanium dioxide slurry obtainable by the afore-mentioned method contains, based on the total weight of the titanium dioxide slurry i. 15 wt.-% to 30 wt.-% of water;
ii. 65 wt.-% to 80 wt.-% of titanium dioxide having a Hegman fineness of less than 8 μm;
iii. 2.0 wt.-% to 5.0 wt.-% of at least one water-soluble and/or water-miscible organic solvent having a boiling point above 100° C.;
iv. 0.3 wt.-% to 0.9 wt.-% of at least one defoamer comprising a silicon oil and/or mineral oil and hydrophobic solid particles;
v. 1.5 wt.-% to 4.0 wt.-% of at least one dispersing agent being selected from the group consisting of polymers containing polyalkyleneoxide groups, the polymers being selected from anionic poly(meth)acrylates and copolymers of (meth)acrylic acid and maleic anhydride, the maleic anhydride being at least partially hydrolyzed and/or neutralized; wherein i., ii., iii., iv. and v. sum up to 97 wt.-% to 100 wt.-% of the total weight of the titanium dioxide slurry.

More preferably the aqueous titanium dioxide slurry obtainable by the afore-mentioned method contains, based on the total weight of the titanium dioxide slurry i. 20 wt.-% to 30 wt.-% of water;
ii. 65 wt.-% to 75 wt.-% of titanium dioxide having a Hegman fineness of less than 8 μm;
iii. 2.5 wt.-% to 4.5 wt.-% of at least one water-soluble and/or water-miscible organic solvent having a boiling point above 100° C.;
iv. 0.4 wt.-% to 0.8 wt.-% of at least one defoamer comprising a silicon oil and/or mineral oil and hydrophobic solid particles;
v. 1.7 wt.-% to 3.8 wt.-% of at least one dispersing agent being selected from the group consisting of polymers containing polyalkyleneoxide groups, the polymers being selected from anionic poly(meth)acrylates and copolymers of (meth)acrylic acid and maleic anhydride, the maleic anhydride being at least partially hydrolyzed and/or neutralized; wherein i., ii., iii., iv. and v. sum up to 99 wt.-% to 100 wt.-% of the total weight of the titanium dioxide slurry.

Since the aforementioned ingredients i., ii., iii., iv. and v. make up 95 wt.-% to 100 wt.-%, preferably 97 wt.-% to 100 wt.-% and even more preferred 99 wt.-% to 100 wt.-%, based on the total weight of the aqueous titanium dioxide slurry, further ingredients, such as typical coatings additives, solvents, and colorants may be introduced. If such ingredients are introduced, the liquid or dissolved ingredients are typically introduced in step (a) of the method for producing the aqueous titanium dioxide slurry according to the invention by mixing the ingredient into the aqueous dispersion medium, and solid ingredients, such as further hydrophobic solid particles, may be introduced in step (b) together with the titanium dioxide. Most preferred no further ingredients are contained in the aqueous titanium dioxide slurry of the present invention.

All components are defined as for the method of producing the aqueous titanium dioxide slurry according to the invention; and any of the above preferred and more preferred ranges for the aqueous titanium dioxide slurry applies for the most general definition of the components as well as for the preferred, more preferred and most preferred definitions of these components likewise.

The titanium dioxide slurry as defined above and/or obtained according to the method of producing the aqueous titanium dioxide slurry preferably possesses a low-shear viscosity (shear rate: 1 $s^{-1}$) at 23° C. determined as described in the experimental part of the present invention in the range 50 to 1800 mPas, more preferred in the range from 70 to 1000 mPas, even more preferred in the range from 80 to 500 mPas and most preferred in the rage from 100 to 300 mPas and even more preferred 100 to 200 mPas.

The solids content (determined as described in the experimental part) of the titanium dioxide slurry as defined above and/or obtained according to the method of producing the aqueous titanium dioxide slurry preferably ranges from 68 to 90 wt.-%, more preferred 70 wt.-% to 80 wt.-% and most preferred 72 wt.-% to 78 wt.-%, based on the total weight of the aqueous titanium dioxide slurry.

Aqueous Coating Composition

The aqueous coating composition according to the invention comprises (A) at least one polymer selected from the group consisting self-crosslinkable polymers and externally crosslinkable polymers; (B) at least one crosslinking agent for crosslinking the at least one polymer (A), if the (A) at least one polymer is an externally crosslinkable polymer; and the aqueous titanium dioxide slurry according to the invention.

The aqueous coating composition of the present invention is preferably a one-pack coating composition.

Most preferred the aqueous coating composition of the present invention is a primer coating composition or a filler coating composition or an aqueous basecoat composition. The term "aqueous" being interchangeable with the term "waterborne".

Component (A)

The aqueous coating composition of the invention contains (A) at least one polymer as component (A). This polymer serves as a binder.

Preferably, the (A) at least one polymer (A) is the main binder of the coating composition. As the main binder in the present invention, a binder component is preferably referred to which is contained in an amount of at least 50 wt.-%, more preferred at least 60 wt.-% and most preferred at least 70 wt.-% based on the total solids content of the respective coating composition.

Suitable polymers which can be used as component (A) are, for example, disclosed in EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1 and WO 2005/021168 A1.

Preferably, the (A) at least one polymer used as component (A) is selected from the group consisting of polyurethanes, polyureas, polyesters, polyamides, polyethers, poly(meth)acrylates and/or copolymers of said polymers, such as polyurethane poly(meth)acrylates and/or polyurethane polyureas.

Preferred polyurethanes are described, for example, in German patent application DE 199 48 004 A1, page 4, line 19 to page 11, line 29 (polyurethane prepolymer B1), in European patent application EP 0 228 003 A1, page 3, line 24 to page 5, line 40, European Patent Application EP 0 634 431 A1, page 3, line 38 to page 8, line 9; and international patent application WO 92/15405, page 2, line 35 to page 10, line 32 or denoted as VD1 and WO 2018/011311 (Example PD1).

Preferred polyesters are described, for example, in DE 4009858 A1 in column 6, line 53 to column 7, line 61 and column 10, line 24 to column 13, line 3 or WO 2014/033135 A2, page 2, line 24 to page 7, line 10 and page 28, line 13 to page 29, line 13 described.

Other suitable polyesters are polyesters having a dendritic structure, as described, for example, in WO 2008/148555 A1.

Preferred polyurethane-poly(meth)acrylate copolymers ((meth)acrylated polyurethanes) and their preparation are described, for example, in WO 91/15528 A1, page 3, line 21 to page 20, line 33 and in DE 4437535 A1, page 2, line 27 to page 6, line 22.

Preferred poly(meth)acrylates are those which can be prepared by multistage free-radical emulsion polymerization of ethylenically unsaturated monomers in water and/or organic solvents. Furthermore, so-called seed-core-shell polymers (SCS polymers) can be used. Such polymers or aqueous dispersions containing such polymers are known, for example, from WO 2016/116299 A1.

Preferred polyurethane-polyurea copolymers are polyurethane-polyurea particles, preferably those having an average particle size of 40 nm to less than about 2000 nm.

The polymer used as component (A) is preferably externally crosslinking and has reactive functional groups which enable a crosslinking reaction. Any common crosslinkable reactive functional group known to those skilled in the art is contemplated.

Preferably, the polymer used as component (A) has at least one kind of functional reactive groups selected from the group consisting of primary amino groups, secondary amino groups, hydroxyl groups, thiol groups, carboxyl groups and carbamate groups. Preferably, the polymer used as component (A) contains at least functional hydroxyl groups.

Preferably, the polymer used as component (A) is hydroxy-functional and more preferably has an OH number in the range of 5 to 250 mg KOH/g, more preferably from 20 to 120 mg KOH/g.

Component (B)

In addition, the aqueous coating composition of the present invention may contain at least one crosslinking agent known to one skilled in the art. Crosslinking agents are to be included among the film-forming non-volatile components of the coating composition, and therefore fall within the general definition of the binder.

While the at least one crosslinking agent is necessary, if the at least one polymer of component (A) is only externally crosslinkable, it is also possible that some crosslinking agents, particularly aminoplast resins as those described below, rather act as flexibilizers, particularly at temperatures below their curing temperature. Thus, in any case, but even in cases where no crosslinker is needed for crosslinking the at least one polymer of component (A), it is still possible to employ component (B), particularly an aminoplast resin as described below to flexibilize the coating.

If a crosslinking agent is present, it is preferably at least one aminoplast resin and/or at least one blocked polyisocyanate, preferably an aminoplast resin. Among the aminoplast resins, melamine resins such as melamine-formaldehyde resins are particularly preferred. The term "polyisocyanate" as used herein encompasses polyisocyanates with two or more isocyanate groups on average. Since the coating compositions according to the invention are preferably one-pack coating compositions the "blocked polyisocyanates" as used herein are preferably fully blocked, i.e. do not contain free isocyanate groups.

Suitable polyisocyanates to produce blocked polyisocyanates include in principle all known aliphatic, cycloaliphatic, aliphatic-cycloaliphatic, aromatic, aliphatic-aromatic and/or cycloaliphatic-aromatic polyisocyanates and polyisocyanate adducts that are used in the aqueous coating materials in fully blocked form. It is also possible to use polyisocyanates containing isocyanurate, biuret, allophanate, iminooxadiazinedione, urethane, urea carbodiimide and/or uretdione groups.

Examples of suitable polyisocyanates are isophorone diisocyanate (=5-isocyanato-1-isocyanatomethyl-1, 3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-tri-methylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanato-eth-1-yl) cyclohexane, 1-isocyanato-2-(4-isocyanatobut-1-yl) cyclohexane, 1,2-diiso-cyanato cyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclo-hexane, 1,4-diisocyanatocyclohexane, dicyclohexylmethane 2,4'-diisocyanate, dicyclohexylmethane 4,4'-diisocyanate, liquid dicyclohexylmethane 4,4'-diisocyanate with a trans/trans content of up to 30% by weight; trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, such as described in the patents WO 97/49745 and WO 97/49747, especially 2-heptyl-3,4-bis(9-isocyanatononyl)-1-pentylcyclohexane, 1,2-, 1,4- or 1,3-bis (isocyanatomethyl)-cyclohexane, 1,2-, 1,4- or 1,3-bis(2-isocyanatoeth-1-yl)cyclohexane, 1,3-bis(3-iso-cyanatoprop-1-yl)cyclohexane, 1.2-, 1,4- or 1,3-bis(4-isocyanatobut-1-yl) cyclohexane, m-tetramethylxylylene diisocyanate (=1,3-bis (2-isocyanatoprop-2-yl)benzene) or tolylene diisocyanate.

Examples of suitable blocking agents to block the polyisocyanates are the blocking agents known from U.S. Pat. No. 4,444,954, particularly phenols, such as phenol, cresol, xylenol, nitrophenol, chlorophenol, ethylphenol, t-butylphenol, hydroxybenzoic acid, esters of this acid, or 2,5-di-tert-butyl-4-hydroxytoluene; lactams, such as epsilon-caprolactam, delta-valerolactam, gamma-butyrolactam or beta-propiolactam; active methylenic compounds, such as diethyl malonate, dimethyl malonate, ethyl or methyl acetoacetate, or acetylacetone; alcohols, such as methanol, ethanol, n-propanol, isopropanol, n-butanol, isobutanol, t-butanol, n-amylalcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol mono methyl ether, methoxymethanol, glycolic acid, glycolic esters, lactic acid, lactic esters, methylolurea, methylolmelamine, diacetone alcohol, ethylene chlorohydrin, ethylenebromohydrin, 1,3-dichloro-2-propanol, 1,4-cyclohexyldimethanol or acetocyanohydrin; mercaptans, such as butyl mercaptan, hexyl mercaptan, t-butyl mercaptan, t-dodecyl mercaptan, 2-mercaptobenzothiazole, thiophenol, methylthiophenol or ethylthiophenol; acid amides, such as acetoanilide, acetoanisidinamide, acrylamide, methacrylamide, acetamide, stearamide or benzamide; imides, such as succinimide, phthalimide or maleimide; amines, such as diphenylamine, phenylnaphthylamine, xylidine, N-phenylxylidine, carbazole, aniline, naphthylamine, butylamine, dibutylamine or butylphenylamine; imidazoles, such as imidazole or 2-ethylimidazole; ureas, such as urea, thiourea, ethyleneurea, ethylenethiourea or 1,3-diphenylurea; carbamates, such as phenyl N-phenylcarbamate or 2-oxazolidone; imines, such as ethyleneimine; oximes, such as acetone oxime, formaldoxime, acetaldoxime, acetoxime, methyl ethyl ketoxime, disobutylketoxime, diacetylmonoxime, benzophenone oxime or chlorohexanone oximes; salts of sulfurous acid, such as sodium bisulfite or potassium bisulfite; hydroxamic esters, such as benzyl methacrylohydroxamate (BMH) or allyl methacrylohydroxamate; or substituted pyrazoles, imidazoles or triazoles; and also mixtures of these blocking agents. The blocking agents are preferably selected so that the blocked isocyanate groups only undergo deblocking, and enter into crosslinking reactions, in precisely the temperature range within which the thermal crosslinking of the coating composition of the invention is to take place, particularly preferred in the temperature range from 120 to 160° C.

Amongst the melamine-formaldehyde resins most preferred are highly alkylated melamine resins and high imino melamine resins.

The highly alkylated melamine resins are similar to hexamethoxymethylmelamine (HMMM) except for the type of alkylation alcohol. The resins contain combinations of methoxy sites and longer chain length alkoxy sites (ethoxy, n-butoxy or iso-butoxy). They also differ from each other in their degree of alkylation and monomer content. Longer chain length alkoxy sites impart lower viscosity, improved flow and levelling and intercoat adhesion. Such resins are efficient crosslinking agents for hydroxyl, carboxyl and amide functional polymers. The practical equivalent weight for most is 140-200. Other advantages are low VOCs, high film flexibility and toughness when used with inherently flexible backbone resins and excellent formulation stability (especially in waterborne system at a pH of 8-9 and good mar resistance properties). They are e.g. commercially available from Allnex under the tradename Cymel®, for example as Cymel® 3020.

The high imino melamine resins are similar to high imino methylated melamines in that they are partially methylated and highly alkylated. They differ from methylated melamine resins in the type of alkylation alcohol, and they contain combinations of methoxy sites and n-butoxy sites. The butoxy sites impart improved flow and levelling and intercoat adhesion properties. As in the methylated species, their composition contains primarily alkoxy/imino or alkoxy/NH functionality. The advantages are fast cure response particularly in waterborne formulations at 120 to 150° C. without the need for strong acid catalyst addition, high film hardness and low formaldehyde release on cure. In addition to reacting with hydroxyl, carboxyl and amide functional polymers, the resins also self-condense readily. Therefore, their practical equivalent weight is typically 200 to 250. They are e.g. commercially available from Allnex under the tradename Cymel®, for example as Cymel® 203.

Further Components (C)

The coating composition of the present invention may contain one or more commonly used coatings additives, solvents or colorants differing from titanium dioxide as further component (C) depending on the desired application. Except for the pigments and fillers and the volatile solvents, the additives remain in the cured coating belong to the binder of the coating composition.

Conventional Coatings Additives (C1)

Thus, the coating composition may comprise at least one additive selected from the group consisting of reactive diluents, light stabilizers, antioxidants, defoamers differing from those in the aqueous titanium dioxide slurry of the present invention, emulsifiers, slip additives, polymerization inhibitors, initiators for free-radical polymerizations, adhesion promoters, film-forming auxiliaries, dispersants differing from those in the aqueous titanium dioxide slurry of the present invention, rheology control agents, sag-control agents (SCA), flame retardants, corrosion inhibitors, siccatives, biocides and matting agents. Further examples of suitable coatings additives are e.g. described in the textbook "Lackadditive" ("Additives for Coatings" by Johan Bieleman, Wiley-VCH, Weinheim, 1998). The additives can be used in the known and customary amounts.

Preferably, their content, based on the total weight of the coating composition of the invention ranges from 0.5 to 3 wt.-%, more preferably 1.0 to 2.8 wt.-%, particularly preferably 1.5 to 2.5 wt.-%.

Organic Solvents (C2)

In addition to water as the main liquid carrier medium of the aqueous coating compositions of the present invention, the compositions may also comprise organic solvents in amounts being typical of those found in common aqueous coating compositions.

Colorants (C3), Such as Pigments, Fillers and Dyes

The coating compositions according to the present invention may contain pigments beside the titanium dioxide pigment employed in the coating compositions of the present invention as aqueous slurry. Such pigments are preferably coloring pigments and/or effect pigments.

The terms "coloring pigment" and "color pigment" are interchangeable and include colored, black and white pigments. As a color pigment inorganic and/organic pigments can be used.

Preferably, the color pigment is an inorganic color pigment, most preferred carbon black.

Examples of white pigments are titanium dioxide, zinc white, zinc sulfide and lithopone. Examples of black pigments are carbon black, iron manganese black and spinel black. Examples of colored pigments are chromium oxide, chromium oxide hydrate green, cobalt green, ultramarine green, cobalt blue, ultramarine blue, manganese blue, ultramarine violet, cobalt and manganese violet, iron oxide red, cadmium sulfoselenide, molybdate red and ultramarine red, iron oxide brown, mixed brown, spinel and corundum phases and chromium orange, iron oxide yellow, nickel titanium yellow, chrome titanium yellow, cadmium sulfide, cadmium zinc sulfide, chrome yellow and bismuth vanadate.

Amongst the effect pigments, particularly metal effect pigments and/or pearlescent effect pigments may be comprised in the coating composition according to the invention.

The term "filler" is known to the person skilled in the art, for example from DIN 55943 (date: October 2001). For the purposes of the present invention, a "filler" is understood as meaning a substance which is essentially insoluble in the application medium, for example the coating composition according to the invention and which is used in particular for increasing the volume. In the context of the present invention, "fillers" preferably differ from "pigments" by their refractive index, which is ≤1.7 for fillers, but >1.7 for pigments. Examples of suitable fillers are kaolin, dolomite, calcite, chalk, calcium sulfate, barium sulfate, talc, silica, in particular pyrogenic silica, hydroxides such as aluminum hydroxide or magnesium hydroxide; in addition, reference is made to Römpp Lexikon Lacke and Druckfarben, Georg Thieme Verlag, 1998, pages 250 ff., "Fillers".

Dyes are colorants which are soluble in the coating composition.

Method of Coating a Substrate

The aqueous coating composition according to the invention can be used in a method for producing a single-layer coating, but also and preferred for producing multi-layer coatings.

The substrates to be coated are preferably plastic, i. e. polymeric or metallic substrates. However, it is also possible to coat other types of substrates such as ceramic substrates, or glass. Polymeric substrates have to withstand the drying and curing conditions. Most preferred are metallic substrates like as steel, such as cold rolled steel, galvanized steel, zinc and aluminum and alloys of the same, such as aluminum/magnesium alloys and plastic substrates, such as polypropylene (PP), polyethylene (PE), acrylnitrilbutadienstyrol (ABS) and ethylene propylene diene monomer rubber (EPDM). Preferred substrates are parts of motor vehicles such as automotive bodies and automotive body parts.

By the method as described in the following it is possible to obtain single layer coated substrates and multilayer-coated substrates. The substrates may already be coated with one or more of a conversion coating layers, an electrodeposition coating layer, particularly preferred a cathodic electrodeposition coating layer, a filler coating layer and/or primer coating layer and a basecoat layer. The term "filler coating" is not to be confused with the term "filler", since a "filler coating" is obtained from a so-called filler coating composition.

The method for producing a coating comprises the following steps 1) optionally applying an electrodeposition coating composition to an optionally conversion-coated metallic substrate and curing the electrodeposition coating to obtain an electrodeposition coating layer; subsequently
2) optionally applying at least one filler coating composition and/or primer coating composition onto the preceding coating layer or on a substrate to obtain one or more filler coating layer(s) and/or primer coating layers and preferably at least partially curing the filler coating layer(s) and/or primer coating layers; subsequently
3) optionally applying at least one basecoat composition onto the preceding coating layer or on a substrate to obtain at least one basecoat layer, preferably drying and/or at least partially curing the basecoat layer(s); subsequently 4) optionally applying at least one clearcoat composition onto the coating layer(s) obtained in the preceding step; and 5) jointly curing all layers that were not cured in any of the preceding steps;

whereby at least one of steps 2) and 3) is carried out and in at least one of steps 2) and 3) the at least one of the filler coating composition, primer coating composition and/or basecoat composition is an aqueous coating composition according to the invention.

Preferably, steps 1) to 5) are carried out in the method of coating a substrate to produce a multi-layer coating according to the invention.

In the process of the invention for producing a multi-layer coating, the individual coating layers, particularly preferred the layers applied in steps 3) and 4) are preferably applied by what is called the wet-on-wet method. In a wet-on-wet method a subsequent layer is applied to a preceding layer without (fully) curing the preceding layer. Examples of such wet-on-wet methods are known from German patent application DE 19948 004 A1, page 17 line 37 to page 19 line 22.

Preferably the aqueous coating composition according to the present invention is used in step 3) as an aqueous basecoat composition for producing a basecoat layer as part of the multi-layer coating, preferably a multi-layer coating for motor vehicles, more particularly automobiles.

The electrodeposition coating layer as formed in optional step 1) is preferably produced from a cathodic electrodeposition coating composition in an electrodeposition dip coating process. Such compositions are preferably based on cathodically depositable poly(meth)acrylate resins or epoxy-amine resins, and crosslinking agents selected from the group consisting of blocked polyisocyanates as disclosed above. A preferred dry layer thickness of the electrodeposition coating layer ranges from 15 μm to 25 μm.

The electrodeposition coating layer is preferably cured before any other layer is applied thereon. The curing temperature preferably ranges from 100 to 250° C., more preferred from 140 to 220° C. and the curing time preferably ranges from 5 to 50 min, more preferred from 10 to 40 min.

As filler coating composition(s) and/or primer coating compositions to be used in optional step 2) any filler coating compositions and primer coating compositions known to one of skill in the art can be used. They are preferably applied by means of electrostatic spray coating. Such coating compositions used to produce the filler coating layer(s) and/or primer coating layer(s) can be solvent-based or aqueous, one- or two pack compositions. However, it is preferred to use the aqueous coating composition according to the present invention as a filler coating composition and/or primer coating composition. A preferred dry layer thickness of the coating layers obtained in step 2) ranges from 15 μm to 45 μm, more preferred 20 μm to 40 μm and most preferred from 25 μm to 35 μm. The drying temperature preferably ranges from 20 to 70° C., more preferred from 25 to 50° C. and the drying time preferably ranges from 2 to 30 min, more preferred from 5 to 15 min. The curing temperature preferably ranges from 140 to 180° C., more preferred from 150 to 170° C. and the curing time preferably ranges from 10 to 40 min, more preferred from 15 to 30 min.

The basecoat compositions as used in optional step 3) can be any basecoat compositions known to one of skill in the art. They are preferably applied by means of electrostatic spray coating. Preferably, the basecoat compositions used to produce the basecoat layer in step 3) are solvent-based or aqueous, one pack or two pack compositions. However, it is preferred to use the aqueous coating composition according to the present invention as basecoat composition. A preferred dry layer thickness of the coating layers obtained in step 3) ranges from 5 μm to 40 μm, more preferred 10 μm to 35 μm and most preferred from 15 μm to 30 μm. The drying temperature preferably ranges from 20 to 90° C., more preferred from 25 to 60° C. and the drying time preferably ranges from 2 to 30 min, more preferred from 5 to 15 min. The curing temperature preferably ranges from 130 to 180° C., more preferred from 150 to 170° C. and the curing time preferably ranges from 10 to 40 min, more preferred from 15 to 30 min.

As clearcoat composition(s) to be used in optional step 4) any clearcoat compositions known to one of skill in the art can be used. They are preferably applied by means of electrostatic spray coating. Preferably, the clearcoat compositions used to produce the clearcoat layer are solvent-based or aqueous, one- or two pack compositions, preferably solvent-based two-pack compositions. A preferred dry layer thickness of the coating layers obtained in step 4) ranges from 30 μm to 60 μm, more preferred 35 μm to 55 μm and most preferred from 40 μm to 50 μm. The drying temperature preferably ranges from 20 to 70° C., more preferred from 25 to 50° C. and the drying time preferably ranges from 2 to 30 min, more preferred from 5 to 15 min. The curing temperature preferably ranges from 130 to 170° C., more preferred from 140 to 160° C. and the curing time preferably ranges from 15 to 45 min, more preferred from 20 to 35 min.

Coated Substrate

Further object of the invention is a coated substrate, which is obtainable according to the methods for producing a coating according to the invention, preferably the substrate being selected from automotive bodies or parts thereof.

In the following, the present invention will be explained in more detail by use of working examples and comparative examples.

EXPERIMENTAL PART

Methods

Determination of Solids Content or Nonvolatile Fraction

The nonvolatile fraction is determined according to DIN EN ISO 3251 (date: June 2008). In the determination of the solids content of the aqueous dispersion, 1 g of sample is weighed out into an aluminum dish dried beforehand, and is dried in a drying oven at 125° C. for 60 minutes, cooled in a desiccator and then weighed again. The residue, relative to the total amount of the sample introduced, corresponds to the nonvolatile fraction. The volume of the nonvolatile fraction may where necessary be determined optionally according to DIN 53219 (date: August 2009).

Determination of the Dry Film Thicknesses

The film thicknesses are determined as in DIN EN ISO 2808 (date: May 2007), method 12A, using the MiniTest® 3100-4100 Instrument from ElectroPhysik.

Determination of Low-Shear and High-Shear Viscosity

The low-shear and high-shear viscosity are determined using a rotary viscometer conforming to DIN 53019-1 (date: September 2008) and calibrated as in DIN 53019-2 (date: February 2001) under temperature-controlled conditions (23.0° C.±0.2° C.). In this investigation, the samples are first sheared for 5 minutes at a shearing rate of 1000 $s^{-1}$ (loading phase) and then sheared at a shear rate of 1 $s^{-1}$ (unloading phase) for 8 minutes. The average viscosity level during the loading phase (high-shear viscosity) and also the level after 8 minutes of unloading (low-shear viscosity) are determined from the measurement data.

Assessment of the Stability of the Premixture of Pigments

The stability of the inventive premixture of pigments, i.e. the inventive aqueous titanium dioxide slurry (or of a comparative composition) is determined visually regarding the sedimentation of the pigments during storage and the ability of the potentially formed sediment during storage to be stirred up. The following criteria are used:

a. Stability: It is determined whether a separation, e.g. in form of a phase separation, occurs during storage of the premixture of pigments after 4 weeks at room temperature or 40° C. in an oven.
b. Sedimentation: It is determined whether pigments settle and form a sediment during the storage due to the lack of stabilization
   The assessment is qualitatively on a scale from 1 to 5 (1=very stable or no sediment; 3=moderately stable or moderate formation of sediment; 5=very unstable or formation of a lot of sediment).
c. Ability to be stirred up: It is determined how easily any sediment that may have formed after storage can be stirred up again to restore a homogenous premixture of pigments. A scale from very easy to very hard is used for the assessment.

Alternatively, an optical assessment of the premixture of the pigments regarding the stability, the demixing behavior and the ability of the potential sediment to be stirred up after storage is performed using three categories: OK (very good), p. OK (partially good) or n.OK (not good).

Assessment of the Fineness of the Premixture of Pigments

The inventive premixture of pigments (or of a comparative composition) are measured with a grindometer according to Hegman according to DIN EN ISO 1524 to determine the fineness or granularity.

Assessment of the Particle Size

The quantiles $x_{10}$, $x_{50}$ or $x_{90}$ of the volume-weighted size distribution of the particles of the inventive premixture of pigments (or of a comparative composition) is determined using centrifugation in an optical cuvette centrifuge according to ISO 13318-2 EN (date September 2007). The LUMiSizer 651 of LUM GmbH is used as a device and cuvettes with an optical path length of 2 mm.

The measurements are performed in duplicates at a measuring temperature of 25° C., a wave length of 410 nm and a rotational speed of 1234 $min^{-1}$ and the average value is calculated.

The calculation of the volume-weighted size distribution is based on values for the density and the refraction index of the respective pigment from the literature. In the examples the following values are used for the titanium dioxide pigments:

Titanium dioxide (rutile form)
Density: 4250 $kg/m^3$
Refraction index: 2.75
Absorption index: 0

Coating of Waterborne Basecoat Wedge-Shaped Structures

To assess the occurrence of pinholes as well as the film thickness dependent levelling, wedge-shaped multi-layer paints are prepared following the general regulations:

One longitudinal edge of a steel sheet with dimensions of 30×50 cm, coated with a standard cathodic electrocoat (CathoGuard® 800 from BASF Coatings GmbH) and exhibiting a roughness value Ra of 0.4-0.5, is prepared with an adhesive tape (tape from the company Tesa, 19 mm) to determine the differences of the film thickness. The waterborne basecoat is applied electrostatically as a wedge with a target film thickness (film thickness of the cured material) of 0-40 μm. After a flash-off time of 2 minutes (analysis of pinholes) or 4-5 minutes (analysis of the levelling of the paint) at room temperature, the structure is cured in a forced air oven for 10 minutes at 60° C. After the removal of the adhesive tape, a commercial two-component clearcoat (ProGloss® from BASF Coatings GmbH) with a target film thickness (film thickness of the cured material) of 40-45 μm is applied manually to the cured waterborne basecoat using a flow-cup gun. The resulting clearcoat layer is flashed off for 10 minutes at room temperature (18-23° C.) and subsequently cured in a forced air oven for 20 minutes at 140° C.

Coating of Waterborne Basecoat Wedge-Shaped Structures on Pre-Tempered Substrates To assess the film thickness dependent levelling on a pre-tempered substrate, wedge-shaped multi-layer coatings are prepared following the general regulations:

One longitudinal edge of a steel sheet with dimensions of 30×50 cm, coated with a standard cathodic electrocoat (CathoGuard® 800 from BASF Coatings GmbH) is prepared with an adhesive tape (tape from the company Tesa, 19 mm) to determine the differences of the film thickness. The substrate thus prepared is pre-tempered for 8 minutes at 55° C.

Subsequently, the waterborne basecoat is applied pneumatically in a wedge shape with a target film thickness (film thickness of the cured material) of 20-40 μm. After a flash-off time of 4-5 minutes at room temperature, the structure is cured in a forced air oven for 6 minutes at 55° C.

After the removal of the adhesive tape, a commercial two-component clearcoat (ProGloss® from BASF Coatings GmbH) with a target film thickness (film thickness of the cured material) of 40-45 μm is applied manually to the cured waterborne basecoat using a flow-cup gun. The resulting clearcoat layer is flashed off for 10 minutes at room temperature (18-23° C.) and subsequently cured in a forced air oven for 20 minutes at 140° C.

Assessment of the Film Thickness Dependent Levelling

The assessment of the multi-layer coatings regarding the film thickness dependent levelling is based on the following general regulations:

The dry film thickness of the overall waterborne basecoat structure is controlled and for the wedge-shaped film thickness of the waterborne basecoat the following ranges are highlighted on the steel sheet: 25-30 μm and 30-35 μm or 20-25 μm, 25-30 μm, 30-35 μm and 35-40 μm.

The film thickness dependent levelling is determined or assessed within the four above-mentioned ranges of the film thickness of the basecoat using the Wave scan instrument (from Byk/Gardner). For this purpose, a laser beam is directed to the investigated surface using a 60° angle. The measuring device recognizes variations of the reflected light within the so-called short-wave range (0.3-1.2 mm) and within the so-called long wave range (1.2-12 mm) within a measuring section of 10 cm (long wave=LW; short wave=SW; the lower the values the better the appearance). Moreover, as a measure of the sharpness of an image reflected in the surface of the multi-layer structure, the measuring device is used to determine the parameter "distinctness of image" (DOI) (the higher the value, the better the appearance).

Determination of the Pinhole Limit

The evaluation of the pinhole sensitivity is performed visually by recording the film thickness of the cured waterborne basecoat when pinholes occur.

Determination of Gloss, Haze and Brightness

To determine the level of gloss and haze in an angle of 20° and if desired, the brightness, an inventive coating composition (or a comparative composition) is applied using a 150 μm spiral blade on an analysis electrolyte-and-white plate equipped with a contrast monitor. After a flash-off time of 10 min at room temperature (18-23° C.), the resulting waterborne basecoat layer is cured in a forced air oven for 10 minutes at 80° C. In case the waterborne basecoat layer is not opaque the layer is cured for additional 10 minutes at 130° C. followed by another application using a 150 μm spiral blade. After a flash-off time of 10 minutes at room temperature, the resulting waterborne basecoat is intermediately dried for 10 minutes at 80° C. Applied to the dried waterborne basecoat film is a commercial two-component clearcoat using a 100 μm spiral blade. The resulting clear coat film is flashed off for 10 min at room temperature (18-23° C.), followed by curing in a forced air oven for 20 minutes at 140° C.

The respective coated substrate is measured with an angle of 20° using a spectrophotometer (BYK Instruments: BYK-mac I Spectrophotometer) to determine the brightness value L*(CIEL*a*b*-color space) or using a micro-haze plus (BYK Instruments) for the determination of the haze value.

EXAMPLES

The inventive and comparative examples below serve to illustrate the invention but should not be given a limiting interpretation.

Unless stated otherwise, the figures in parts are parts by weight, and the figures in percent are in each case percentage by weight.

Applied Commercial Titanium Dioxide Slurries

The following titanium dioxide slurries are commercially available and are used for the purpose of comparison:

KRONOS 4311: available from KRONOS WORLDWIDE, Inc.; the slurry comprises the pigment Titan Rutil 2310 (rutile type also available from KRONOS WORLDWIDE, Inc.; produced using the chlorine process HEUCOTINT UN 280061 HW: available from Heubach GmbH; the slurry comprises a titanium dioxide pigment rutile type that was produced using the chlorine process 1 Preparation of Intermediate Products 1.1 Preparation of a Comparative Paste PP1

The white paste is prepared from 50 parts by weight Titan Rutil 2310 (from KRONOS WORLDWIDE, rutile type, produced using the chlorine process), 6 parts by weight of a polyester prepared in DE 40 09 858 A1 (example D, column 16, lines 37-59), 24.7 parts by weight binder dispersion prepared in EP 022 8003 B2 (page 8, lines 6-18), 10.5 parts by weight deionized water, 4 parts by weight 2,4,7,9-tetramethyl-5-decyne-diol (52% in BG; from BASF SE), 4.1 parts by weight butyl glycol, 0.4 parts by weight 10% dimethylethanolamine in water and 0.3 parts by weight Acrysol RM-8 (from The Dow Chemical Company) by a grinding process.

1.2 Preparation of a Matting Paste MP1

The matting paste is prepared from 12 parts by weight Syloid® ED 3 (from W.R. Grace & Co.), 30 parts by weight of a polyester prepared in DE 40 09 858 A1 (example D, column 16, lines 37-59), 46 parts by weight butyl glycol and 12 parts by weight 10% dimethylethanolamine in water.

1.3 Preparation of a Black Paste PP2

The black paste is prepared from 10 parts by weight carbon black (carbon black Monarch® 1400 from Cabot Corporation), 57 parts by weight of an aqueous binder dispersion prepared according to WO 91/15528 (page 23, line 26 to page 25, line 24), 25 parts by weight deionized water, 2 parts by weight Pluriol® P900 (from BASF SE) and 6 parts by weight 10% dimethylethanolamine in water.

2 Preparation of Intermediate Products 2.1 Preparation of the Comparative Titanium Dioxide Preparations PS1 to PS4

The components listed in table 2.1 are added in the indicated order and stirred to an aqueous mixture except for the pigment. The mixture is stirred intensively for 10 min to form a homogenous mixture. Subsequently, the pigment is added whilst stirring. Afterwards, the resulting mixture is dispersed intensively for another 10-20 minutes with the help of a dissolver (e.g. MasterMix® from Netzsch), an inline-dissolver (e.g. Cavitron® CD 1010 from Firma Cavitron) or a jet stream mixer (e.g. Conti-TDS 5 from Firma Ystral).

TABLE 2.1

Preparation of the comparative pigment preparations PS1 to PS4

| | PS1 | PS2 | PS3 | PS4 |
|---|---|---|---|---|
| Deionized water | 20.0 | 20.0 | 20.0 | 26.0 |
| 2,4,7,9-tetramethyl-5-decyne-diol, 52% in BG (from BASF SE) | 5.0 | | 5.0 | 0.5 |
| Pluriol ® P900 (from BASF SE) | | 5.0 | | 0.5 |
| 1-Propoxy-2-propanol | | | | 0.5 |
| DISPERBYK-199 (from BYK-Chemie GmbH) | 5.0 | 5.0 | | |
| ANTI-TERRA-250 (from BYK-Chemie GmbH) | | | 5.0 | 2.5 |
| Titan Rutil 2310 (from KRONOS) | 70.0 | 70.0 | 70.0 | 70.0 |
| Sum: | 100.0 | 100.0 | 100.0 | 100.0 |

2.2 Preparation of the Inventive Titanium Dioxide Preparations PS5* to PS9*

The components listed in table 2.2 are added in the indicated order and stirred to an aqueous mixture except for the pigment. The mixture is stirred intensively for 10 min to form a homogenous mixture. Subsequently, the pigment is added whilst stirring and in case of sample PS7* a hydrophobic silica (Aerosil® R 972) is added additionally. Afterwards, the resulting mixture is dispersed intensively for another 10-20 minutes with the help of a dissolver (e.g. MasterMix® from Netzsch), an inline-dissolver (e.g. Cavitron® CD 1010 from Firma Cavitron) or a jet stream mixer (e.g. Conti-TDS 5 from Firma Ystral). It was evaluated that all three devices are suitable for the present invention. If necessary, the pH value is adjusted to be in the range between 8 to 9 by addition of a dimethylethanolamine solution and/or the solids content is adjusted by the addition of water and subsequent stirring for 10 minutes.

TABLE 2.2

Preparation of the inventive pigment preparations PS5* to PS9*

| | PS5* | PS6* | PS7* | PS8* | PS9* |
|---|---|---|---|---|---|
| Premixture | | | | | |
| Deionized water | 13.0 | 10.0 | 10.0 | 10.5 | 21.9 |
| Defoamer* | 0.5 | 0.5 | 0.5 | 0.6 | 0.6 |
| Butyldiglycol | 3.0 | 3.0 | 3.0 | 3.8 | 3.8 |
| Dispering Agent** | 2.0 | 2.0 | 2.0 | 2.5 | 3.5 |

TABLE 2.2-continued

| Preparation of the inventive pigment preparations PS5* to PS9* | | | | | |
|---|---|---|---|---|---|
| | PS5* | PS6* | PS7* | PS8* | PS9* |
| Titan Rutil 2310 (from KRONOS) | 70.0 | 70.0 | 70.0 | 70.0 | 70.0 |
| Aerosil ® R 972 (from Evonik) | | | 0.2 | | |
| 10% dimethylethanolamine in water | | | | | 0.2 |
| Adjustment of viscosity and solids | | | | | |
| Deionized water | 11.5 | 14.5 | 14.3 | 12.6 | |
| Sum: | 100.0 | 100.0 | 100.0 | 100.0 | 100.0 |

*defoamer according the invention based on hydrogenated naphthenic mineral oil in mixture with hydrophobic silica

**dispersing agent according to the invention (mixture of polyethylene oxide groups containing, anionic poly(meth)acrylate further containing polymerized monomers of butyl acrylate and polymerized units of a nitrogen-containing heteroaromatic vinyl group containing monomer with a polyethylene oxide containing copolymer of (meth)acrylic acid and partially hydrolyzed and neutralized maleic anhydride)

3 Examples for the Preparation of Waterborne Basecoats

3.1 Preparation of Comparative Waterborne Basecoats WBL1 and WBL2 and the Inventive Waterborne Basecoat WBL3*

The components listed under "aqueous phase" in table 3.1 are added in the indicated order and stirred to an aqueous mixture. After the mixture was stirred for 10 minutes, the mixture is adjusted to a pH value of 8.5±0.2 using deionized water and dimethylethanolamine and a spray viscosity of 135±10 mPa·s at a shear stress of 1000 $s^{-1}$, measured with a rotational viscometer (Rheolab QC with temperature control C-LTD80/QC from Anton Paar) at 23° C.

TABLE 3.1

| Preparation of the waterborne basecoats WBL1 to WBL3* | | | |
|---|---|---|---|
| Aqueous phase: | WBL1 | WBL2 | WBL3* |
| 3% Na—Mg-sheet silicate solution | 2.0 | 2.0 | 2.0 |
| Deionized water | 5.6 | | |
| White paste PP1 | 52.0 | | |
| Titanium dioxide slurry KRONOS 4311 | | 37.0 | |

TABLE 3.1-continued

| Preparation of the waterborne basecoats WBL1 to WBL3* | | | |
|---|---|---|---|
| Aqueous phase: | WBL1 | WBL2 | WBL3* |
| (from KRONOS) | | | |
| Titanium dioxide slurry PS8* | | | 37.0 |
| 2-Ethylhexanol | 1.9 | 1.9 | 1.9 |
| Binder dispersion (prepared according to EP 022 8003 B2, p. 8, lines 6-18) | | 20.0 | 20.0 |
| Daotan ® VTW 6464/36WA (from Allnex) | 16.8 | 16.8 | 16.8 |
| Polyester (prepared according to p. 28, lines 13-33 (example BE1) WO 2014/033135 A2) | 2.5 | 2.5 | 2.5 |
| Melamine formaldehyde resin (Cymel ® 1133 from Allnex) | 1.2 | 1.2 | 1.2 |
| Melamine formaldehyde resin (Cymel ® 203 from Allnex) | 0.9 | 0.9 | 0.9 |
| Polyester (prepared according to example D, column 16, lines 37-59 in DE 40 09 858 A1) | 2.4 | 2.4 | 2.4 |
| 10% dimethylethanolamine in water | 1.4 | 1.4 | 1.4 |
| 2,4,7,9-tetramethyl-5-decyne-diol, 52% in BG (from BASF SE) | 1.1 | 1.1 | 1.1 |
| Butyldiglycol | 2.8 | 2.8 | 2.8 |
| Ethylenglycol | 2.4 | 2.4 | 2.4 |
| Di(propylene glycol) methyl ether | 3.0 | 3.0 | 3.0 |
| Isopar ® L (from Exxon Mobile) | 1.9 | 1.9 | 1.9 |
| Hydrosol A170 (from DHC Solvent Chemie GmbH) | 0.9 | 0.9 | 0.9 |
| Tinuvin ® 123 (from BASF SE) | 0.4 | 0.4 | 0.4 |
| Tinuvin ® 384-2 (from BASF SE) | 0.8 | 0.8 | 0.8 |
| Sum: | 100.0 | 99.4 | 99.4 |

3.2 Preparation of Comparative Waterborne Basecoats WBL4 and WBL5 and the Inventive Waterborne Basecoats WBL6* and WBL7*

The components listed under "aqueous phase" in table 3.2 are added in the indicated order and stirred to an aqueous mixture. After the mixture was stirred for 10 minutes, the mixture is adjusted to a pH value of 8.0±0.2 using deionized water and dimethylethanolamine and a spray viscosity of 100±10 mPa·s at a shear stress of 1000 $s^{-1}$, measured with a rotational viscometer (Rheolab QC with temperature control C-LTD80/QC from Anton Paar) at 23° C.

TABLE 3.2

| Preparation of the waterborne basecoats WBL4 to WBL7* | | | | |
|---|---|---|---|---|
| Aqueous phase: | WBL4 | WBL5 | WBL6* | WBL7* |
| 3% Na—Mg- sheet silicate solution | 7.2 | 18.0 | 18.0 | 18.0 |
| Deionized water | 4.6 | 11.5 | 11.5 | 11.5 |
| 2-Ethylhexanol | 0.5 | 3.2 | 3.2 | 3.2 |
| Aqueous binder dispersion (prepared according to WO 92/15405, p. 13, line 13 to p. 15, line 13) | 7.4 | 18.6 | 18.6 | 18.6 |
| Polyester (prepared according to example D, column 16, lines 37-59 of DE 40 09 858 A1) | | 4.0 | 4.0 | 4.0 |
| Polyurethane modified polyacrylate (prepared according to p. 7, line 55 to p. 8, line 23 of DE 4437535 A1) | 1.4 | 3.4 | 3.4 | 3.4 |
| 3 weight-% aqueous Rheovis ® AS 1130 solution (Rheovis ® AS 1130 from BASF SE) | 0.7 | 1.9 | 1.9 | 1.9 |
| Melamine formaldehyde resin (Cymel ® 3020 from Allnex) | 1.5 | 3.7 | 3.7 | 3.7 |
| 10% dimethylethanolamine in water | 0.2 | 0.6 | 0.6 | 0.6 |
| 2,4,7,9-tetramethyl-5-decyne-diol, 52% in BG (from BASF SE) | 1.4 | 1.9 | 1.9 | 1.9 |
| Butyl glycol | 0.5 | 1.2 | 1.2 | 1.2 |
| 50 weight-% solution of Rheovis ® PU1250 in butyl glycol (Rheovis ® PU1250 from BASF SE) | 0.1 | 0.3 | 0.3 | 0.3 |
| Matting paste MP1 | 0.2 | 0.6 | 0.6 | 0.6 |
| White paste PP1 | 50.0 | | | |
| Titanium dioxide slurry KRONOS 4311 (from KRONOS) | | 50.0 | | |

TABLE 3.2-continued

| Preparation of the waterborne basecoats WBL4 to WBL7* | | | | |
|---|---|---|---|---|
| Aqueous phase: | WBL4 | WBL5 | WBL6* | WBL7* |
| Titanium dioxide slurry PS8* | | | 50.0 | |
| Titanium dioxide slurry PS9* | | | | 50.0 |
| Sum: | 75.7 | 119.0 | 119.0 | 119.0 |

3.3 Preparation of Comparative Waterborne Basecoats WBL8 and WBL9 and the Inventive Waterborne Basecoats WBL10* and WBL11*

The components listed under "aqueous phase" in table 3.3 are added in the indicated order and stirred to an aqueous mixture. After the mixture was stirred for 10 minutes, the mixture is adjusted to a pH value of 8.0±0.2 using deionized water and dimethylethanolamine and a spray viscosity of 100±10 mPa·s at a shear stress of 1000 $s^{-1}$, measured with a rotational viscometer (Rheolab QC with temperature control C-LTD80/QC from Anton Paar) at 23° C.

TABLE 3.3

| Preparation of the waterborne basecoats WBL8 to WBL11* | | | | |
|---|---|---|---|---|
| Wässrige Phase: | WBL8 | WBL9 | WBL10* | WBL11* |
| 3% Na—Mg- sheet silicate solution | 7.2 | 18.0 | 18.0 | 18.0 |
| Deionized water | 4.6 | 11.5 | 11.5 | 11.5 |
| 2-Ethylhexanol | 0.5 | 3.2 | 3.2 | 3.2 |
| Aqueous binder dispersion (prepared according to WO 92/15405, p. 13, line 13 to p. 15, line 13) | 7.4 | 18.6 | 18.6 | 18.6 |
| Polyester (prepared according to example D, column 16, lines 37-59 of DE 40 09 858 A1) | | 4.0 | 4.0 | 4.0 |
| Polyurethane modified polyacrylate (prepared according to p. 7, line 55 to p. 8, line 23 of DE 4437535 A1) | 1.4 | 3.4 | 3.4 | 3.4 |
| 3 weight-% aqueous Rheovis ® AS 1130 solution (Rheovis ® AS 1130 from BASF SE) | 0.7 | 1.9 | 1.9 | 1.9 |
| Melamine formaldehyde resin (Cymel ® 3020 from Firma Allnex) | 1.5 | 3.7 | 3.7 | 3.7 |
| 10% dimethylethanolamine in water | 0.2 | 0.6 | 0.6 | 0.6 |
| 2,4,7,9-tetramethyl-5-decyne-diol, 52% in BG (from BASF SE) | 1.4 | 1.9 | 1.9 | 1.9 |
| Butyl glycol | 0.5 | 1.2 | 1.2 | 1.2 |
| 50 weight-% solution of Rheovis ® PU1250 in butyl glycol (Rheovis ® PU1250 from BASF SE) | 0.1 | 0.3 | 0.3 | 0.3 |
| Matting paste MP1 | 0.2 | 0.6 | 0.6 | 0.6 |
| White paste PP1 | 50.0 | | | |
| Titanium dioxide slurry KRONOS 4311 (from KRONOS) | | 50.0 | | |
| Titanium dioxide slurry PS8* | | | 50.0 | |
| Titanium dioxide slurry PS9* | | | | 50.0 |
| Black paste PP2 | 2.8 | 3.9 | 3.9 | 3.9 |
| Sum: | 78.5 | 122.9 | 122.9 | 122.9 |

4 Comparison of the Comparative and Inventive Pigment Preparations and Waterborne Basecoats 4.1 Comparison of the Pigment Preparations PS1 to PS4 and KRONOS 4311 (Comparative Preparations) to PS5* to PS9* (Inventive Preparations) Regarding their Rheological Behavior, Assessment of the Stability and the Fineness and Distribution of the Particle Size The evaluation of the titanium dioxide pigment preparations PS1 to PS4 (comparative preparations) to PS5* to PS9* (inventive preparations) as well as the reference slurry KRONOS 4311 (comparative example) regarding their rheological behavior, the assessment of the (storage) stability as well as the fineness and the distribution of the particle size of the respective premixture of pigments is based on the aforementioned methods. The tables 4.1 to 4.6 summarize the results.

TABLE 4.1

Comparison of the comparative pigment preparations PS1 to PS4 as well as reference KRONOS 4311 regarding their rheological behavior and (storage) stability

| | | PS1 | PS2 | PS3 | PS4 | KRONOS 4311 | HEUCOTINT UN 280061 HW |
|---|---|---|---|---|---|---|---|
| Comment | | thin | very thin | very thick | Thin | very thin | very thick |
| Viscosity | 1000/s | 53 | 47 | 159 | 62 | 27 | 624 |
| [mPas] | 1/s | 2898 | 1285 | 12165 | 1904 | 1293 | 16096 |
| Stability | | 2-3 | 2-3 | 3 | 2-3 | 3-4 | n.d. |
| Sedimentation | | 2 | 2 | 3 | 2-3 | 3-4 | n.d |
| Stir-up ability | | easy | easy | Easy | Easy | moderate | n.d |

n.d. = not determined

TABLE 4.2

Comparison of the inventive pigment preparations PS5* to PS9* regarding their rheological behavior and (storage) stability

| | | PS5* | PS6* | PS7* | PS8* | PS9* |
|---|---|---|---|---|---|---|
| Comment | | very thin | very thin | very thin | very thin | very thin |
| Viscosity | 1000/s | 29 | 33 | 33 | 27 | n.d. |
| [mPas] | 1/s | 141 | 174 | 171 | 103 | n.d. |
| Stability | | 1-2 | 1-2 | 1-2 | 1-2 | 1-2 |
| Sedimentation | | 1-2 | 1-2 | 1-2 | 1-2 | 1-2 |
| Stir-up ability | | very easy | very easy | very easy | very easy | very easy |

n.d. = not determined

The data listed in tables 4.1 and 4.2 prove that the inventive titanium dioxide pigment preparations PS5* to PS9* exhibit clearly a lower low-shear viscosity and consequently a potentially improved pumpability but also a significantly increased stability. PS5* to PS9* display a lower degree of sedimentation of the dispersed pigment particles. Moreover, the sediment can be stirred up more easily than in the comparative samples PS1 to PS4 as well as in the reference slurry KRONOS 4311.

The reference slurry HEUCOTINT UN 280061 HW exhibits with 60% a lower pigment fraction than the titanium dioxide pigment preparation PS1 to PS4 and PS5* to PS9* as well as KRONOS 4311. Additionally, the pumpability cannot be guaranteed because the low-shear viscosity was higher than 16000 mPas.

TABLE 4.3

Comparison of the reference KRONOS 4311 with inventive pigment preparation PS8* regarding the storage stability

| | | PS8* | | | | KRONOS 4311 | | | |
|---|---|---|---|---|---|---|---|---|---|
| Storage stability | | fresh | 2 weeks room temp. | 4 weeks room temp. | 2 weeks 40° C. | fresh | 2 weeks room temp. | 4 weeks room temp. | 4 weeks 40° C. |
| Viscosity | 1000/s | 27 | 28 | 29 | 37 | 27 | 24 | not measurable due to the formation of sediment | |
| [mPas] | 1/s | 103 | 115 | 106 | 183 | 1293 | 1140 | | |

TABLE 4.4

Comparison of the reference KRONOS 4311 with inventive pigment preparation PS8* regarding an optical evaluation of the storage stability

| | PS8* | | KRONOS 4311 | |
|---|---|---|---|---|
| Storage stability | fresh | 4 weeks 40° C. | fresh | 4 weeks 40° C. |
| optical evaluation | ok | ok; slight sediment, easy to stir up | ok | not ok; high amount of sediment and phase; difficult to stir up |

The tables 4.3 and 4.4 prove that the inventive pigment preparation PS8* exhibit a higher storage stability at 40° C. than the reference KRONOS 4311. The low-shear and high-shear viscosity of the inventive pigment preparation PS8* and the reference KRONOS 4311 has a constant level during the storage at room temperature for 2 or 4 weeks. In contrast to KRONOS 4311, PS8* is also stable during the storage in the oven and displays only a moderate increase of the viscosity, the light sediment can be stirred up easily and to re-disperse. KRONOS 4311 is not measurable due to the sediment that is difficult to be stirred-up.

TABLE 4.5

Comparison of the reference KRONOS 4311 and the comparative pigment paste PP1 with inventive pigment preparation PS8* regarding their fineness

| | PP1 | PS8* | KRONOS 4311 |
|---|---|---|---|
| Fineness [μm] (grindometer) | <5 | <5 | 15-20 |

TABLE 4.6

Comparison of the reference KRONOS 4311 with inventive pigment preparation PS8* regarding the volume-weighted size distribution of the particles

| | Quantile of the volume-weighted size distribution of the particles Q3(x) according to ISO 13318-2 in nm | | |
|---|---|---|---|
| | $x_{10}$ | $x_{50}$ | $x_{90}$ |
| KRONOS 4311 | 244 | 356 | 472 |
| PS8* | 280 | 380 | 488 |

The determination of the fineness of the respective pigment preparation leads to the result that the comparative paste PP1 and inventive paste PS8* exhibit a better degree of grinding in contrast to KRONOS 4311. The inventive paste PS8* achieves without a grinding process the same degree of grinding as paste PP1, which is produced using an energy-intensive grinding process.

A comparison between PS8* and KRONOS 4311 using photo centrifugation highlights that the comparable quantiles within the scope of the measurement accuracy of the volume-weighted size distribution of the particles are achieved.

4.2 Comparison of the Waterborne Basecoats WBL1 and WBL2 (Comparative Preparations) to WBL3* (Inventive Preparation) Regarding their Film Thickness Dependent Levelling and Limit of Pinholes The examination of the waterborne basecoats WBL1 (comprising comparative paste PP1), WBL2 (comprising reference slurry KRONOS 4311) and WBL3* (comprising the inventive pigment preparation PS8*) regarding their film thickness dependent levelling and limit of pinholes are performed according to the aforementioned methods. The tables 4.7 to 4.9 summarize the results.

TABLE 4.7

Comparison of the waterborne basecoats WBL1, WBL2 and WBL3* regarding their film thickness dependent levelling

| Parameter | Range of the film thickness | Waterborne basecoat | | |
|---|---|---|---|---|
| Appearance | of the basecoat | WBL1 | WBL2 | WBL3* |
| SW | 20 μm-25 μm | 23.9 | 21.7 | 14.2 |
| | 25 μm-30 μm | 25.3 | 25.3 | 14.7 |
| | 30 μm-35 μm | 27.9 | 27.4 | 16.3 |
| | 35 μm-40 μm | 29.7 | 30.4 | 17.7 |
| LW | 20 μm-25 μm | 6.6 | 5.8 | 6.7 |
| | 25 μm-30 μm | 7.1 | 6.0 | 6.5 |
| | 30 μm-35 μm | 7.5 | 6.9 | 5.7 |
| | 35 μm-40 μm | 8.3 | 7.7 | 5.7 |

TABLE 4.7-continued

Comparison of the waterborne basecoats WBL1, WBL2 and WBL3* regarding their film thickness dependent levelling

| Parameter | Range of the film thickness | Waterborne basecoat | | |
|---|---|---|---|---|
| Appearance | of the basecoat | WBL1 | WBL2 | WBL3* |
| DOI | 20 μm-25 μm | 86.8 | 87.3 | 86.8 |
| | 25 μm-30 μm | 86.5 | 84.3 | 86.1 |
| | 30 μm-35 μm | 83.3 | 83.4 | 87.3 |
| | 35 μm-40 μm | 82.4 | 80.9 | 87.5 |

TABLE 4.8

Comparison of the waterborne basecoats WBL1, WBL2 and WBL3* regarding their film thickness dependent levelling on a pre-tempered substrate

| Parameter | Range of the film thickness | Waterborne basecoat | | |
|---|---|---|---|---|
| Appearance | of the basecoat | WBL1 | WBL2 | WBL3* |
| SW | 25 μm-30 μm | 13.2 | 16.4 | 11.3 |
| | 30 μm-35 μm | 14.4 | 15.0 | 12.2 |
| LW | 25 μm-30 μm | 15.8 | 22.3 | 17.8 |
| | 30 μm-35 μm | 14.9 | 24.0 | 16.8 |
| DOI | 25 μm-30 μm | 91.2 | 88.2 | 94.2 |
| | 30 μm-35 μm | 88.9 | 89.4 | 93.1 |

The tables 4.7 and 4.8 prove that the use of the inventive pigment preparation PS8* in the inventive waterborne basecoat WBL3* results in an improved film thickness dependent levelling especially regarding the short wave and DOI. Using a pre-tempered sheet to resemble the coating of substrates in the interior, a significant improve of the levelling of the inventive waterborne basecoat was detected in contrast to the comparative waterborne basecoat that are based on the comparative paste PP1 or the reference slurry KRONOS 4311.

TABLE 4.9

Comparison of the waterborne basecoats WBL1, WBL2 and WBL3* regarding their limit of pinholes

| | Waterborne basecoat | | |
|---|---|---|---|
| | WBL1 | WBL2 | WBL3* |
| Limit of pinholes [μm] | 28.0 | 20.0 | 27.0 |

The results in table 4.9 show that the substitution of the comparative paste PP1 in WBL1 by the inventive pigment preparation PS8* (WBL3*) has almost no influence on the limit of pinholes whereas the use of the reference slurry KRONOS 4311 (WBL2) significantly worsens the limit of pinholes.

4.3 Comparison of the Waterborne Basecoats WBL4 and WBL5 as Well as WBL8 and WBL9 (Comparative Preparations) to WBL6* and WBL7* as Well as WBL10* and WBL11* (Inventive Preparation) Regarding the Degree of Gloss, the Haze Value and Brightness The investigations of the waterborne basecoats WBL4 and WBL8 (comprising the comparative paste PP1), WBL5 and WBL9 (comprising the reference slurry KRONOS 4311), WBL6* and WBL10* (comprising the inventive pigment preparation PS8*) and WBL7* and WBL11* (comprising the inventive pigment preparation PS9*) regarding the degree of gloss, the haze value and brightness are performed according to the aforementioned methods. The tables 4.10 and 4.11 summarize the results.

TABLE 4.10

Comparison of the waterborne basecoats WBL4 and WBL5 as well as WBL6* and WBL7* regarding the degree of gloss, the haze value and brightness

| | Waterborne basecoat | | | |
|---|---|---|---|---|
| Parameter | WBL4 | WBL5 | WBL6* | WBL7* |
| Gloss at 20° | 90.0 | 88.3 | 90.2 | 90.8 |
| Haze at 20° | 4.2 | 5.1 | 4.4 | 3.9 |
| Brightness L* | 96.8 | 97.1 | 97.0 | n.d. |

n.d. = not determined

TABLE 4.11

Comparison of the waterborne basecoats WBL8 and WBL9 as well as WBL10* and WBL11* regarding the degree of gloss and the haze value

| | Waterborne basecoat | | | |
|---|---|---|---|---|
| Parameter | WBL8 | WBL9 | WBL10* | WBL11* |
| Gloss at 20° | 88.7 | 87.0 | 88.3 | 90.1 |
| Haze at 20° | 2.6 | 3.0 | 2.3 | 2.3 |

The tables 4.10 and 4.11 show that the use of the inventive pigment preparations PS8* and PS9* in the inventive waterborne basecoats WBL6* and WBL7* as well as WBL10* and WBL11* results in equivalent values for the gloss, haze or brightness compared to WBL4 and WBL5 or WBL8 and WBL9. In comparison to reference slurry KRONOS 4311, advantages with regard to gloss and haze were detected.

5. Preparation of Mixtures of Titanium Dioxide Pigment Preparations with Different Binders 5.1 Preparation of the Comparative Mixtures M1 to M6

The components listed in table 5.1 are added in the indicated order and stirred to an aqueous mixture. The mixture is stirred intensively for 10 minutes to prepare a homogenous mixture that exhibits a ratio of pigment content to binder content of 5.1.

TABLE 5.1

Preparation of the comparative binder mixtures M1 to M6

| | M1 | M2 | M3 | M4 | M5 | M6 |
|---|---|---|---|---|---|---|
| Titanium dioxide slurry KRONOS 4311 (from KRONOS) | 64.6 | 74.5 | 66.3 | 70.3 | 85.4 | 75.6 |
| Binder dispersion (prepared according to EP 022 8003 B2, p. 8, lines 6-18) | 35.4 | | | | | |
| Aqueous polyurethane-polyurea-dispersion (prepared according to EP 3 229 976 B1, p. 20, line 28 - p. 21, line 27 (example D1) (PUR-μ-gel) | | 25.5 | | | | |
| Polyurethane dispersion (prepared according to WO 92/15405, p. 13, line 13 to p. 15, line 13) | | | 33.7 | | | |
| Polyurethane dispersion (prepared according to WO 92/15405, p. 15, lines 23-28) | | | | 29.7 | | |
| Polyester (prepared according to WO 2014/033135 A2, p. 28, lines 13-33 (example BE1)) | | | | | 14.6 | |
| Polyacrylate (prepared according to U.S. Pat. No. 5,320,673, column 17, line 53 - column 18, line 29 (example 2)) | | | | | | 24.4 |
| Sum: | 100.0 | 100.0 | 100.0 | 100.0 | 100.0 | 100.0 |
| Ratio pigment/binder: | 5.1 | 5.1 | 5.1 | 5.1 | 5.1 | 5.1 |

5.2 Preparation of the Inventive Mixtures M7* to M12*

The components listed in table 5.2 are added in the indicated order and stirred to an aqueous mixture. The mixture is stirred intensively for 10 minutes to prepare a homogenous mixture that exhibits a ratio of pigment content to binder content of 5.1.

TABLE 5.2

| Preparation of the inventive binder mixtures M7* to M12* | M7* | M8* | M9* | M10* | M11* | M12* |
|---|---|---|---|---|---|---|
| Titanium dioxide slurry PS8* | 64.6 | 74.5 | 66.3 | 70.3 | 85.4 | 75.6 |
| Binder dispersion (prepared according to EP 022 8003 B2, p. 8, lines 6-18) | 35.4 | | | | | |
| Aqueous polyurethane-polyurea-dispersion, (prepared according to EP 3 229 976 B1, p. 20, line 28 - p. 21, line 27 (example D1) (PUR-μ-gel) | | 25.5 | | | | |
| Polyurethane dispersion (prepared according to WO 92/15405, p. 13, line 13 to p. 15, line 13) | | | 33.7 | | | |
| Polyurethane dispersion (prepared according to WO 92/15405, p. 15, lines 23-28) | | | | 29.7 | | |
| Polyester (prepared according to WO 2014/033135 A2 p. 28, lines 13-33 (example BE1)) | | | | | 14.6 | |
| Polyacrylate (prepared according to U.S. Pat. No. 5,320,673, column 17, line 53 - column 18, line 29 (example 2)) | | | | | | 24.4 |
| Sum: | 100.0 | 100.0 | 100.0 | 100.0 | 100.0 | 100.0 |
| Ratio pigment/binder: | 5.1 | 5.1 | 5.1 | 5.1 | 5.1 | 5.1 |

6. Comparison of the Comparative and Inventive Mixtures of Pigment Preparations with Different Binders 6.1 Comparison of Mixtures M1 to M6 Based on KRONOS 4311 (Comparative) to M7* to M12* Based on PS8* (Inventive) Regarding their Rheological Behavior and the Assessment of the Tendency of Titanium Dioxide to Sediment The investigation of the mixtures M1 to M6 based on KRONOS 4311 (comparative) to M7* to M12* based on PS8* (inventive) regarding their rheological behavior and the assessment of their tendency of titanium dioxide to sediment was performed according to the aforementioned methods. Table 6.1 summarizes the results.

TABLE 6.1

Comparison of the comparative mixtures M1 to M6 to the inventive mixtures M7* to M12* regarding the shear viscosity and sedimentation

| | | Mixture with: | | | | | |
|---|---|---|---|---|---|---|---|
| | | Binder dispersion, prepared according to EP 022 8003 B2, p. 8, lines 6-18 | Aqueous polyurethane-polyurea-dispersion, prepared according to EP 3 229 976 B1, p. 20, line 28 - p. 21, line 27 (example D1) | Polyurethane dispersion, prepared according to WO 92/15405, p. 13, line 13 to p. 15, line 13 | Polyurethane dispersion, prepared according to WO 92/15405, p. 15, lines 23-28 | Polyester; prepared according to WO 2014/033135 A2, p. 28, lines 13-33 (example BE1) | Polyacrylate; prepared according to U.S. Pat. No. 5,320,673, column 17, line 53 - column 18, line 29 (example 2) |
| | | M1 | M2 | M3 | M4 | M5 | M6 |
| KRONOS 4311 | Viscosity [mPas] at 1/s | 241 | 297 | 650 | 1018 | 2463 | not measureable |
| | Sedimentation | 3-4 | 2-3 | 2 | 1-2 | 1-2 | n.d. |
| | | M7* | M8* | M9* | M10* | M11* | M12* |
| PS8* | Viscosity [mPas] at 1/s | 238 | 94 | 345 | 382 | 2311 | 1111 |
| | Sedimentation | 2 | 1-2 | 1-2 | 1-2 | 1-2 | 1-2 |

n.d. = not determined

The data in table 6.1 reveal that the use of the inventive pigment preparation PS8* in mixtures with different binders results in lower rheological interactions compared to the reference slurry KRONOS 4311. Especially the polyacrylate prepared according to U.S. Pat. No. 5,320,673, column 17, line 53 to column 18, line 29 (example 2) exhibit a high incompatibility with KRONOS 4311. The rheological interaction is too high to measure the sample and the sedimentation is not determinable.

In contrast, PS8* demonstrates a high compatibility with this binder and the low-shear viscosity increases only moderately compared to the pure slurry.

Moreover, table 6.1 reveals that M7* to M12* exhibit a significantly better sedimentation compared to the respective references M1 to M6. The better stability of PS8* as well as the advantages with respect to the compatibility with different binders prove that the inventive pigment slurry enables more possibilities to create a preparation than the reference slurry.

The invention claimed is:

1. A method for producing an aqueous titanium dioxide slurry, comprising (a) providing an aqueous dispersion medium, containing, based on the total weight of the dispersion medium a. at least 50 wt.-% of water;

b. 10 wt.-% to 28 wt.-% of at least one water-soluble and/or water-miscible organic solvent having a boiling point above 100° C.;

c. 1.0 wt.-% to 5.0 wt.-% of at least one defoamer comprising:

a silicon oil and/or mineral oil; and hydrophobic solid particles selected from the group consisting of hydrophobic ureas and hydrophobic silicas; and d. 6.0 wt.-% to 20.0 wt.-% of a dispersing agent selected from the group consisting of polymers containing polyalkyleneoxide groups, the polymers being selected from the group consisting of anionic poly(meth)acrylates and copolymers of (meth) acrylic acid and maleic anhydride, the maleic anhydride being at least partially hydrolyzed and/or neutralized; wherein a., b., c. and d. sum up to 95 wt.-% to 100 wt.-% of the total weight of the dispersion medium (b) dispersing titanium dioxide particles into the aqueous dispersion medium provided in step (a) to obtain a titanium dioxide slurry containing at least 65 wt.-% up to 85 wt.-% of titanium dioxide, based on the total weight of the thus obtained slurry, wherein step (b) is carried out by sole use of a non-milling mixing device and at least until the Hegman fineness of the titanium dioxide particles is below 15 μm; and optionally (c) adjusting the titanium dioxide content of the titanium dioxide slurry obtained in step (b) to an amount from 65 wt.-% to 75 wt.-% based on the total weight of the titanium dioxide slurry by adding a binder-free aqueous medium and optionally a pH adjusting agent.

2. The method according to claim 1, wherein the water-miscible or water-soluble organic solvent is selected from the group consisting of glycols and glycol ethers.

3. The method according to claim 1, wherein the defoamer contains a mineral oil and hydrophobic silica particles.

4. The method according to claim 1, wherein the dispersing agent contains at least one of a poly(meth)acrylate comprising polymerized units of (meth)acrylic acid, (meth)acrylic acid esters of alkanols containing 1 to 8 carbon atoms, (meth)acrylic acid esters of polyethyleneoxides, and polymerized units of heteroaromatic vinyl group containing monomers containing nitrogen as heteroatom; and/or a copolymer of (meth)acrylic acid and maleic anhydride, the maleic anhydride being at least partially hydrolyzed and/or neutralized and the copolymer containing polyethyleneoxide groups.

5. The method according to claim 1, wherein the non-milling mixing device is a dissolver.

* * * * *